United States Patent
Wright et al.

(10) Patent No.: US 9,221,456 B2
(45) Date of Patent: Dec. 29, 2015

(54) VEHICLE POWER GENERATION MODE CONTROL METHOD

(71) Applicant: Ford Global Technologies, LLC, Dearborn, MI (US)

(72) Inventors: Robert Wright, Royal Oak, MI (US); Walter Joseph Ortmann, Saline, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/225,072

(22) Filed: Mar. 25, 2014

(65) Prior Publication Data

US 2015/0274151 A1  Oct. 1, 2015

(51) Int. Cl.
| | |
|---|---|
| G06F 17/00 | (2006.01) |
| B60W 20/00 | (2006.01) |
| B60R 25/06 | (2006.01) |
| B60W 10/06 | (2006.01) |
| B60W 10/10 | (2012.01) |
| H02P 9/04 | (2006.01) |
| H02K 7/18 | (2006.01) |

(52) U.S. Cl.
CPC .............. *B60W 20/108* (2013.01); *B60R 25/06* (2013.01); *B60W 10/06* (2013.01); *B60W 10/10* (2013.01); *B60W 20/50* (2013.01); *H02K 7/1815* (2013.01); *H02P 9/04* (2013.01); *Y10S 903/93* (2013.01)

(58) Field of Classification Search
CPC . A62C 27/00; B60L 2200/26; B60L 11/1892; B60L 11/1894; Y02T 10/6217
USPC ........... 701/22; 180/53.5, 65.1, 65.245, 65.31
See application file for complete search history.

(56) References Cited

U.S. PATENT DOCUMENTS

| | | | | |
|---|---|---|---|---|
| 4,747,269 | A * | 5/1988 | David ............................ | 60/445 |
| 6,076,503 | A * | 6/2000 | Carpenter ..................... | 123/438 |
| 6,275,759 | B1 * | 8/2001 | Nakajima et al. ............... | 701/54 |
| 6,885,920 | B2 * | 4/2005 | Yakes et al. ..................... | 701/22 |
| 7,277,782 | B2 * | 10/2007 | Yakes et al. ..................... | 701/22 |
| 7,658,249 | B2 | 2/2010 | Buglione et al. | |
| 7,689,332 | B2 * | 3/2010 | Yakes et al. ..................... | 701/22 |
| 7,711,460 | B2 * | 5/2010 | Yakes et al. ..................... | 701/22 |
| 8,000,850 | B2 * | 8/2011 | Nasr et al. ....................... | 701/20 |
| 2002/0115531 | A1 * | 8/2002 | Degroot et al. ................. | 477/92 |
| 2008/0071438 | A1 * | 3/2008 | Nasr et al. ....................... | 701/22 |
| 2010/0250039 | A1 * | 9/2010 | Bryan et al. ..................... | 701/22 |
| 2010/0258099 | A1 * | 10/2010 | Andersson et al. ........... | 123/676 |

(Continued)

OTHER PUBLICATIONS

Gong et al. Trip Based Power Management of Plug-in Hybrid Electric Vehicle with Two Scale Dynamic, 2007, IEEE, p. 12-19.*

(Continued)

*Primary Examiner* — McDieunel Marc
(74) *Attorney, Agent, or Firm* — David Kelley, Esq.; Tung & Associates

(57) ABSTRACT

A vehicle power generation mode control method includes initiating a vehicle power generation mode request; determining whether at least one of the following conditions exists: high engine revolutions per minute is allowed; high voltage or amperage draw is allowed; current fuel level supports power generation mode; and carbon monoxide readings are within acceptable limits; denying requests for engagement of a vehicle transmission if at least one of the conditions exists; and allowing or commanding the vehicle power generation mode.

20 Claims, 2 Drawing Sheets

(56) References Cited

U.S. PATENT DOCUMENTS

2013/0118149 A1* 5/2013 Sloss ............................... 60/274
2013/0289808 A1* 10/2013 Ross ............................... 701/22

OTHER PUBLICATIONS

Chen et al., A Life Tester for Hybrid Vehicle E-Machine Systems, 2009, IEEE, p. 1017-1024.*

Alnajjar et al. Minimization of Energy Losses in the Traction Drive of HEV using Optimized Adaptive Control, 2014, IEEE, p. 1-5.*

Gong et al., Computationally Efficient Optimal Power Management for Plug-in Hybrid Electric Vehicles Based on Spatial-Domain Two-Scale Dynamic Programming, 2008, IEEE, p. 90-95.*

* cited by examiner

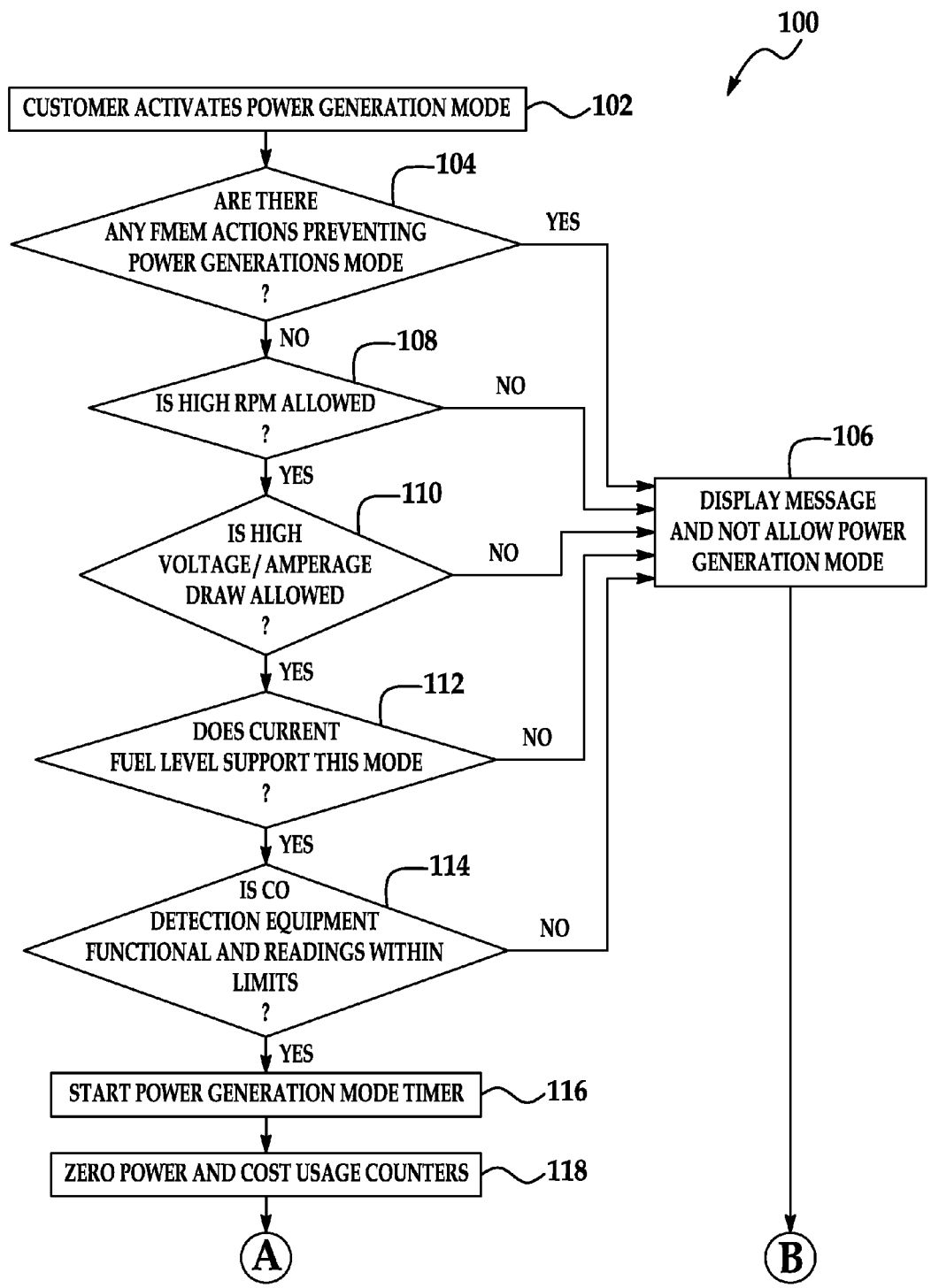

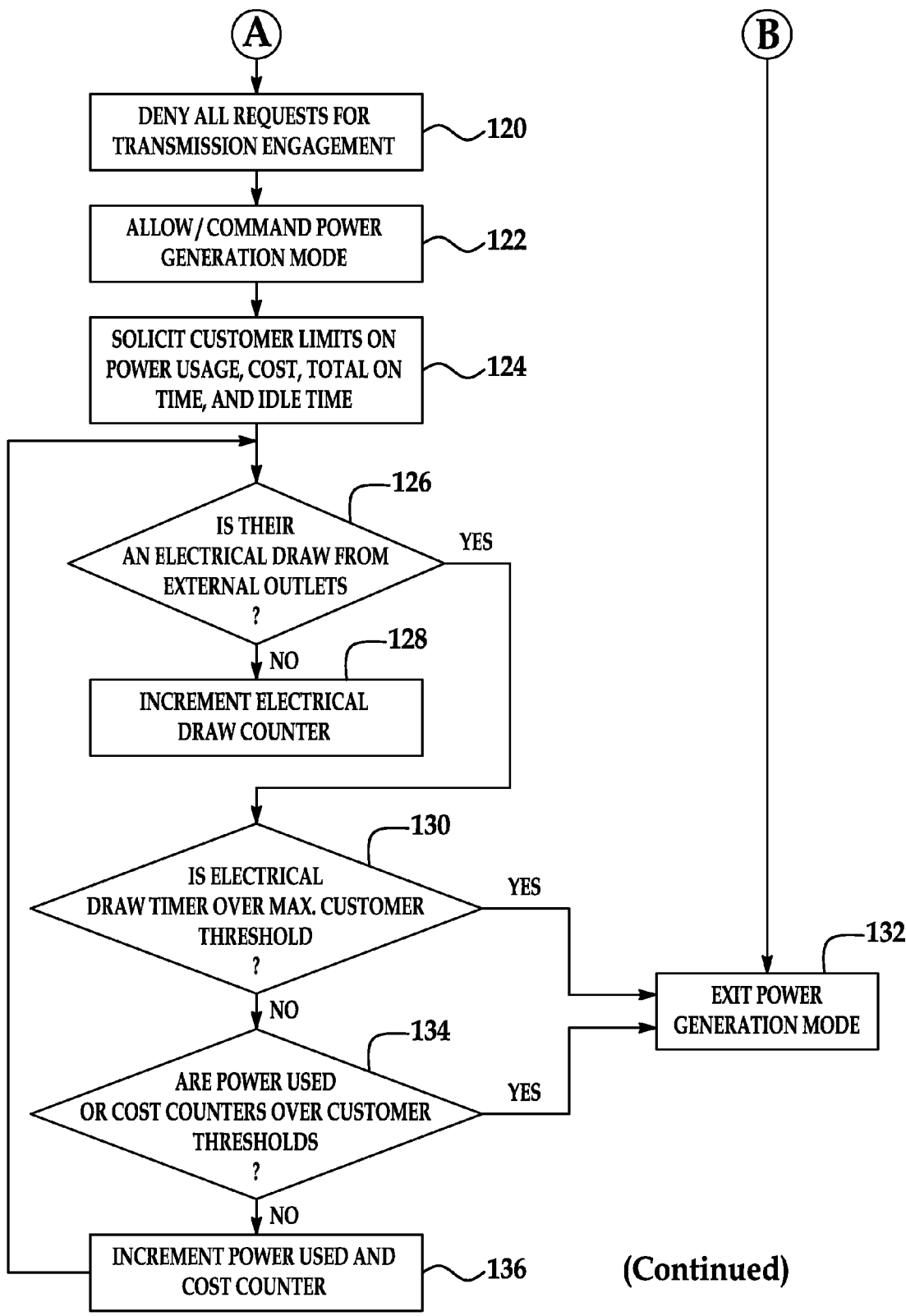

VEHICLE POWER GENERATION MODE CONTROL METHOD

FIELD

Illustrative embodiments of the disclosure relate to hybrid electric vehicles (HEVs). More particularly, illustrative embodiments of the disclosure relate to a vehicle power generation control method which allows an engine of an HEV to generate high electrical output while preventing the HEV from being driven by an unauthorized person.

BACKGROUND

Hybrid electric vehicles may be operated to provide electrical power for use by auxiliary equipment such as drills, saws and other tools at a job site. Therefore, it may be desirable for the HEV to remain running while it is unsupervised.

Accordingly, a vehicle power generation control method which allows an engine of an HEV to generate high electrical output while preventing the HEV from being driven by an unauthorized person may be desirable.

SUMMARY

Illustrative embodiments of the disclosure are generally directed to a vehicle power generation mode control method. An illustrative embodiment of the method includes initiating a vehicle power generation mode request; determining whether at least one of the following conditions exists: high engine revolutions per minute is allowed; high voltage or amperage draw is allowed; current fuel level supports power generation mode; and carbon monoxide readings are within acceptable limits; denying requests for engagement of a vehicle transmission if at least one of the conditions exists; and allowing or commanding the vehicle power generation mode.

BRIEF DESCRIPTION OF THE DRAWINGS

Illustrative embodiments of the disclosure will now be described, by way of example, with reference to the accompanying drawings, in which:

FIG. 1 is a flow diagram of an illustrative embodiment of the vehicle power generation mode control method.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Moreover, the illustrative embodiments described herein are not exhaustive and embodiments or implementations other than those which are described herein and which fall within the scope of the appended claims are possible. Furthermore, there is no intention to be bound by any expressed or implied theory presented in the preceding technical field, background, brief summary or the following detailed description.

Illustrative embodiments of the disclosure are generally directed to a vehicle power generation control method which allows an engine of an HEV to generate high electrical output while preventing the HEV from being driven by an unauthorized person. When the HEV is put into a power generation mode in which the vehicle is to be used as an electrical generator to power external auxiliary equipment, the method may prevent the vehicle from being driven away by an unauthorized or unintended person. The ECM (Engine Control Module), TCM (Transmission Control Module) and/or PCM (Powertrain Control Module) may be programmed to implement the method.

Referring to FIG. 1, an illustrative embodiment of a vehicle power generation mode control method 100 is shown. At block 102, a vehicle operator may activate a power generation mode request in an HEV (Hybrid Electric Vehicle). The power generation mode enables the HEV to power auxiliary equipment such as drills, saws and other tools at a job site, for example and without limitation. At block 104, a determination may be made as to whether there exists any FMEM (Failure Mode Effect Management) actions which prevent engagement of the power generation mode of the vehicle. If there does exist any such FMEM actions, then a message to that effect may be displayed and the power generation mode may be disallowed at block 106.

If there does not exist any FMEM actions which prevent engagement of the power generation mode of the vehicle at block 104, then a determination may be made as to whether high engine Revolutions Per Minute (RPMs) of the vehicle engine are allowed at block 108. If high RPMs of the vehicle engine are not allowed, then a message to that effect may be displayed and the power generation mode may be disallowed at block 106. If high RPMs of the vehicle engine are allowed, then a determination may be made as to whether high voltage or amperage draw is allowed at block 110.

If high voltage or amperage draw is not allowed at block 110, then a message to that effect may be displayed and the power generation mode may be disallowed at block 106. If high voltage or amperage draw is allowed at block 110, then a determination may be made as to whether the current fuel level supports the power generation mode at block 112. If the current fuel level does not support the power generation mode, then a message to that effect may be displayed and the power generation mode may be disallowed at block 106.

If the current fuel level does support the power generation mode at block 112, then a determination may be made as to whether the carbon monoxide (CO) detection equipment of the HEV is functional and CO readings are within acceptable limits at block 114. If the CO readings are not within acceptable limits, then a message to that effect may be displayed and the power generation mode may be disallowed at block 106.

If the CO readings are within acceptable limits at block 114, then a power generation mode timer may be started at block 116. At block 118, the power usage counter and fuel cost counter may be zeroed. At block 120, all requests for engagement of the HEV transmission may be denied. At block 122, the power generation mode may be allowed or commanded. At block 124, customer limits on power usage, fuel cost, total on time and idle time may be solicited.

At block 126, a determination may be made as to whether there is an electrical draw from external electrical outlets. If not, then the electrical draw counter may be incremented at block 128. If there is an electrical draw from the external electrical outlet at block 126, then block 128 may be bypassed and at block 130, a determination may be made as to whether the electrical draw timer exceeds the maximum customer-set threshold.

If the electrical draw timer exceeds the maximum customer-set threshold at block 130, then the power generation mode may be exited at block 132. If the electrical draw timer does not exceed the maximum customer-set threshold at block 130, then a determination may be made as to whether the power used counter or the cost counter exceeds the customer-set thresholds at block 134. If yes, then the power generation mode may be exited at block 132. If not, then the power used counter and the cost counter may be incremented at block 136 and the method may return to block 126.

Although the embodiments of this disclosure have been described with respect to certain exemplary embodiments, it is to be understood that the specific embodiments are for purposes of illustration and not limitation, as other variations will occur to those of skill in the art.

What is claimed is:

1. A vehicle power generation mode control method for an HEV vehicle implemented by a controller associated with the vehicle, the controller executing programmed instructions stored in non-transitory memory, comprising:
the controller:
initiating a vehicle power generation mode request to cause generation of electric power by the vehicle in response to an authorized user of the vehicle;
denying requests by an unauthorized user for engagement of a vehicle transmission if none of predetermined denial conditions of the vehicle exist, the denial conditions of the vehicle comprising engine revolutions per minute and a fuel level; and
allowing or commanding the vehicle power generation mode if none of the predetermined denial conditions exist, the vehicle power generation mode allowing drawing of electrical power from the vehicle without driving of the vehicle.

2. The method of claim 1 wherein the set of predetermined denial conditions of the vehicle includes:
the engine revolution per minute above a threshold level is not allowed;
voltage of amperage draw of electrical power from the vehicle above a threshold level is not allowed;
the current fuel level does not support the vehicle power generation mode; and
carbon monoxide readings are not within acceptable limits.

3. The method of claim 1 further comprising causing displaying a message indicating that at least one of the conditions exist if at least one of the conditions exist.

4. The method of claim 1 further comprising causing starting a generation mode timer to time the generation of the electrical power during the vehicle power generation mode before allowing or commanding the vehicle power generation mode.

5. The method of claim 1 further comprising causing zeroing and starting a power usage counter to determine an amount of electrical power drawn from the vehicle during the vehicle power generation mode before allowing or commanding the vehicle power generation mode.

6. The method of claim 1 further comprising causing zeroing and starting a fuel cost counter to determine a fuel cost of generation of the electrical power during the vehicle power generation mode before allowing or commanding the vehicle power generation mode.

7. The method of claim 1 further comprising soliciting operator limits on power usage of electrical power drawn during the vehicle power generation mode and exiting the vehicle power generation mode if the operator limits on power usage are exceeded.

8. The method of claim 1 further comprising soliciting operator limits on a fuel cost of generation of the electrical power during the vehicle power generation mode and exiting the vehicle power generation mode if the operator limits on fuel cost are exceeded.

9. A vehicle power generation mode control method for an HEV vehicle implemented by a controller associated with the vehicle, the controller executing programmed instructions stored in non-transitory memory, comprising:
the controller:
initiating a vehicle power generation mode request to cause generation of electric power by the vehicle in response to an authorized user of the vehicle;
determining whether each of the following conditions of the vehicle exists:
engine revolutions per minute above a threshold is allowed;
voltage or amperage draw of electric power from the vehicle above a threshold is allowed;
current fuel level of the vehicle supports the vehicle power generation mode; and
carbon monoxide readings of the vehicle are within acceptable limits;
denying requests for engagement of a vehicle transmission by an unauthorized user if each of the conditions exists; and
allowing or commanding the vehicle power generation mode if each of the conditions exist, the vehicle power generation mode allowing drawing of electrical power from the vehicle without driving of the vehicle.

10. The method of claim 9 further comprising determining whether any Failure Mode Effect Management actions preventing the power generation mode exists, and allowing or commanding the vehicle power generation mode if Failure Mode Effect Management actions preventing the vehicle power generation mode do not exist.

11. The method of claim 9 further comprising causing displaying a message indicating that at least one of the conditions does not exist if at least one of the conditions does not exist.

12. The method of claim 9 further comprising causing starting a generation mode timer to time the generation of the electrical power during the vehicle power generation mode before allowing or commanding the vehicle power generation mode.

13. The method of claim 9 further comprising causing zeroing and starting a power usage counter to determine an amount of electrical power drawn from the vehicle during the vehicle power generation mode before allowing or commanding the vehicle power generation mode.

14. The method of claim 9 further comprising causing zeroing and starting a fuel cost counter to determine a fuel cost of generation of the electrical power during the vehicle power generation mode before allowing or commanding the vehicle power generation mode.

15. The method of claim 9 further comprising soliciting operator limits on power usage of electrical power drawn from the vehicle during the vehicle power generation mode and exiting the vehicle power generation mode if the operator limits on power usage are exceeded.

16. The method of claim 9 further comprising soliciting operator limits on a fuel cost of generation of the electrical power during the vehicle power generation mode and exiting the vehicle power generation mode if the operator limits on fuel cost are exceeded.

17. A vehicle power generation mode control method for an HEV vehicle implemented by a controller associated with the vehicle, the controller executing programmed instructions stored in non-transitory memory, comprising:

the controller:
- initiating a vehicle power generation mode request to cause generation of electric power by the vehicle in response to an authorized user of the vehicle;
- performing each of the following to determine conditions of the vehicle:
  - determining whether engine revolutions per minute above a threshold is allowed;
  - determining whether voltage or amperage draw of electric power from the vehicle above a threshold is allowed if the engine revolutions per minute is allowed;
  - determining whether a current fuel level supports power generation mode if the voltage or amperage draw is allowed; and
  - determining whether carbon monoxide readings are within acceptable limits if the current fuel level supports the power generation mode;
- denying requests initiated by an unauthorized user of the vehicle for engagement of a vehicle transmission of the vehicle if each of the determinations is affirmative; and
- allowing or commanding the vehicle power generation mode if each of the determinations is affirmative, the vehicle power generation mode allowing drawing of electrical power from the vehicle without driving of the vehicle.

18. The method of claim 17 further comprising determining whether any Failure Mode Effect Management actions preventing the vehicle power generation mode exists, and determining whether the engine revolutions per minute is allowed if Failure Mode Effect Management actions preventing the vehicle power generation mode do not exist.

19. The method of claim 17 further comprising soliciting operator limits on power usage of electrical power drawn from the vehicle during the vehicle power generation mode and exiting the vehicle power generation mode if the operator limits on power usage are exceeded.

20. The method of claim 17 further comprising soliciting operator limits on a fuel cost of generation of the electrical power during the vehicle power generation mode and exiting the vehicle power generation mode if the operator limits on fuel cost are exceeded.

* * * * *